United States Patent [19]

Anderson

[11] Patent Number: 5,114,001
[45] Date of Patent: May 19, 1992

[54] SPLICE APPARATUS INCLUDING SPLICE PLATES WITH COMPOUND CURVATURE

[75] Inventor: William B. Anderson, Oconomowoc, Wis.

[73] Assignee: Rexnord Corporation, Milwaukee, Wis.

[21] Appl. No.: 741,070

[22] Filed: Aug. 5, 1991

[51] Int. Cl.⁵ .............................................. B65G 15/30
[52] U.S. Cl. .................................. 198/844.2; 474/257; 24/37
[58] Field of Search .................... 198/844.2; 24/37; 474/257

[56] References Cited

U.S. PATENT DOCUMENTS

| | | |
|---|---|---|
| 275,896 | 4/1883 | Eibee . |
| 291,202 | 1/1884 | Koch . |
| 1,543,559 | 6/1925 | Donnelly . |
| 1,643,037 | 9/1927 | Vollrath . |
| 1,878,003 | 9/1932 | Smith . |
| 2,446,311 | 8/1948 | Traxler .............................. 74/231 |
| 3,748,698 | 7/1973 | Lachmann ........................... 24/38 |
| 4,056,867 | 11/1977 | Wert et al. ........................ 24/37 |
| 4,161,059 | 7/1979 | Francois ............................ 29/432 |
| 4,312,526 | 1/1982 | Cassel .............................. 285/419 |
| 4,489,827 | 12/1984 | Anderson .......................... 198/844 |
| 4,540,389 | 9/1985 | Ramsey ............................. 474/257 |
| 4,734,959 | 4/1988 | Jaubert ............................. 474/257 |
| 4,757,576 | 7/1988 | Jaubert ............................. 198/844.2 |

FOREIGN PATENT DOCUMENTS

| | | |
|---|---|---|
| 709353 | 8/1931 | France . |
| 21078 | of 1899 | United Kingdom . |
| 24685 | of 1903 | United Kingdom . |
| 260868 | 11/1926 | United Kingdom . |
| 322536 | 12/1929 | United Kingdom . |

OTHER PUBLICATIONS

Article by William B. Anderson, "A Maintenance Free Splice for Belt Bucket Elevators", published in Bulk Solids Handling, The International Journal of Storing and Handling Bulk Material, vol. 2, No. 3, pp. 539-541 (Sep. 1982).
Installation Instruction for Dura Splice.

*Primary Examiner*—Joseph E. Valenza
*Attorney, Agent, or Firm*—Michael, Best & Friedrich

[57] ABSTRACT

A belt assembly comprising a belt member including a pair of end portion and a roller member engaging portion, first and second splice members each including a belt engaging surface having a flat section that engages one of the end portions, and a curved section including a first segment and a second segment engageable with the roller member engaging portion. The first and second segments of each splice member include respective first and second radii of curvature, the second radius of curvature being greater than the first radius of curvature. A plurality of bolts are provided for fastening the first and second splice members together to secure therebetween the end portions of the belt member.

16 Claims, 2 Drawing Sheets

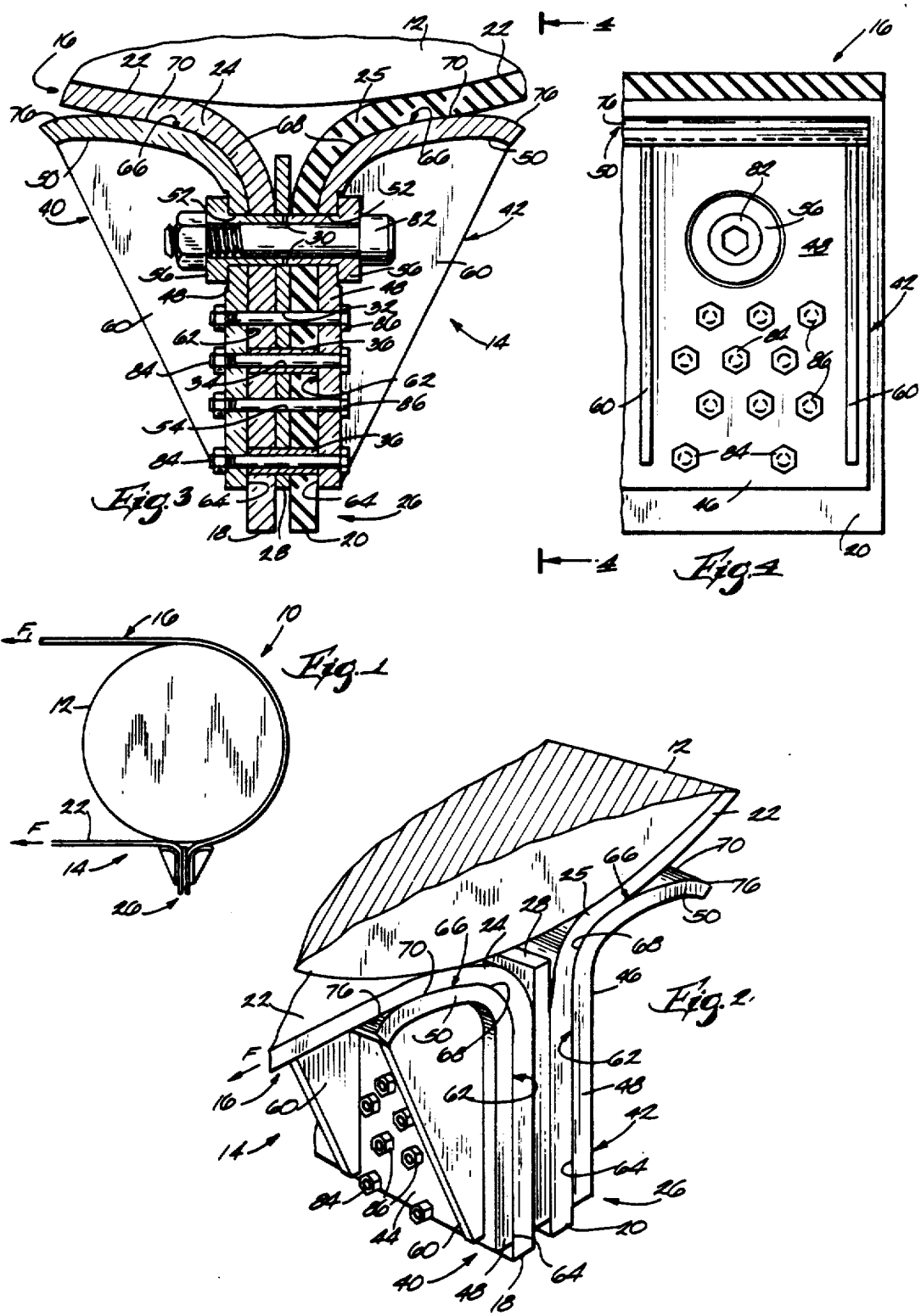

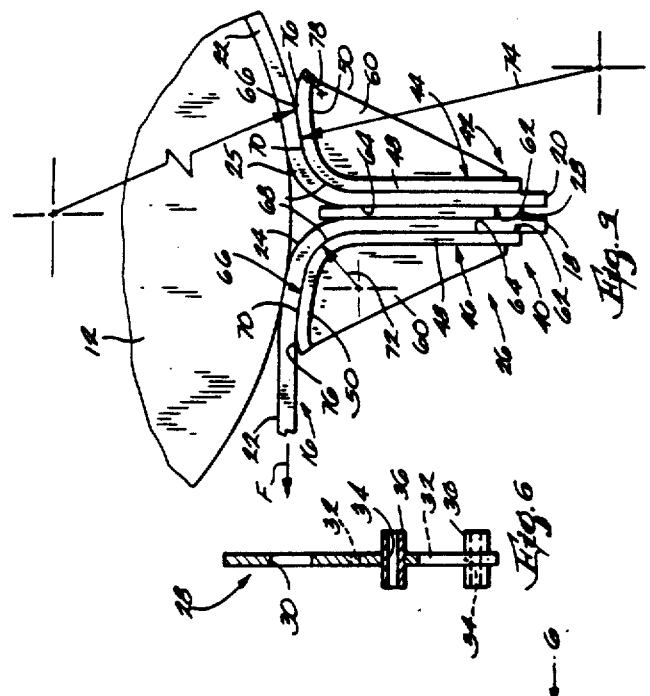
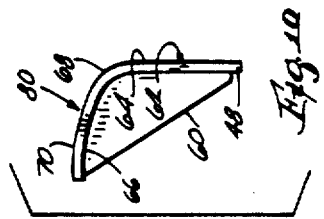
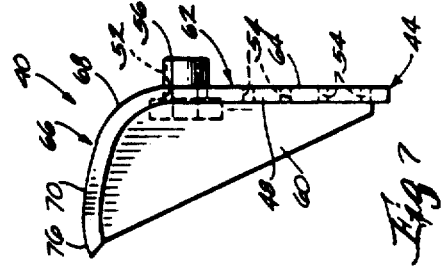
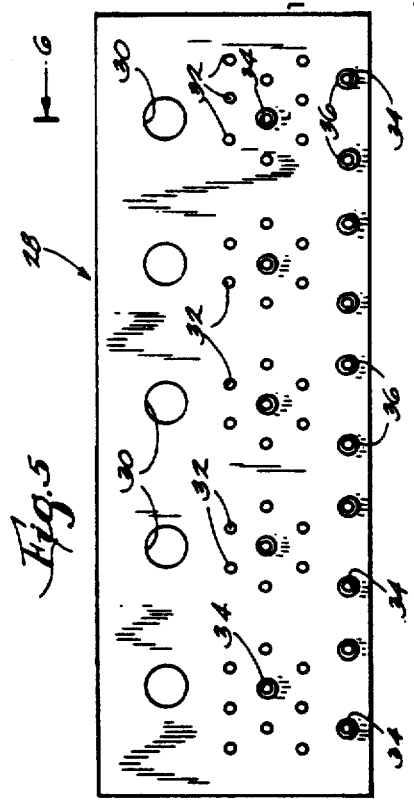
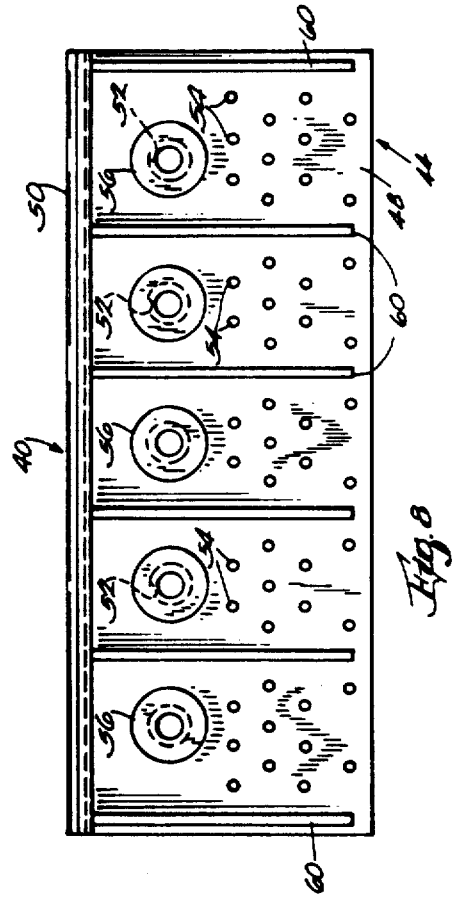

SPLICE APPARATUS INCLUDING SPLICE PLATES WITH COMPOUND CURVATURE

BACKGROUND OF THE INVENTION

1. Field of the Invention

The invention relates generally to splice apparatus for belt members, and more particularly to a mechanical splice apparatus including splice plates having belt engaging portions with compound curvature for reducing belt flexure to decrease belt wear and improve splice performance.

2. Reference to Prior Art

Splice devices are used to splice together the ends of one or more belts which are employed in high tension applications such as belt bucket elevators. An example of a mechanical splicing apparatus used in such applications is provided in U.S. Pat. No. 4,489,827 which issued Dec. 25, 1984 to Anderson. As disclosed in this patent, the splicing apparatus includes a pair of outer splice plates which are arranged in oppositely facing relation to one another on the outside of the belt ends and which are bolted together to secure the belt ends therebetween. The splice plates are each generally hook-shaped and include respective flat portions between which the belt ends are secured, and rounded end portions around which the belt is partially supported so that the belt ends are curved at about right angles to the rest of the belt. Other splice apparatus including splice plates having flat clamping portions and rounded belt support portions are shown in U.S. Pat. No. 1,543,559 issued Jun. 23, 1925 to Donnely, British Patent No. 322,536 accepted Dec. 9, 1929, and British Patent No. 260,868 accepted Nov. 11, 1926.

SUMMARY OF THE INVENTION

The present invention provides a splice apparatus including splice members that each include a belt engaging surface having a flat section and a generally curved section which supports part of the belt and which is specially configured to reduce localized belt flexure in those belt portions adjacent the splice apparatus.

A principle feature of the invention is the provision of a splice apparatus including an outer splice plate having a belt engaging surface that is provided with a portion of compound curvature which facilitates the reduction of localized belt flexure otherwise occurring in prior art splice arrangements.

It has been observed that repeated belt flexure, and especially localized flexing during the application of varying tensile loads encountered in high tension belts when the belt traverses belt support structure, is a contributing factor to belt stretching and wear leading to premature belt replacement or failure. Such belt flexure can also contribute to the premature fatigue failure of splice fasteners caused by increased amounts of cyclical shear loads applied to these fasteners. To alleviate these problems, the splice apparatus of the present invention employs outer splice plates having sections of compound curvature for reduced localized belt flexure, especially when the splice apparatus traverses a pulley or like belt support structure.

More specifically, the invention provides a belt assembly comprising a belt member including a pair of end portions and a roller member engaging portion, a first splice member including a belt engaging surface having a flat section engaging one of the end portions, and a curved section including a first segment and a second segment engageable with the roller member engaging portion, the first and second segments including respective first and second radii of curvature, the second radius of curvature being greater than the first radius of curvature, a second splice member including a belt engaging surface having a flat section engaging the other of the end portions, and means for fastening the first and second splice members together to secure therebetween the end portions of the belt member.

The invention also provides a mechanical splice apparatus for securing together a pair of belt end portions, the splice apparatus comprising a first splice member including a belt engaging surface having a flat section adapted to engage one of the end portions and a support section adapted to support a belt portion which is adjacent the one end portion, the support section including a first curved segment and a second curved segment, the first curved segment being positioned between the second curved segment and the flat section, and the first and second curved segments including respective first and second radii of curvature, the second radius of curvature being greater than the first radius of curvature, a second splice member including a belt engaging surface having a clamping section adapted to engage the other of the belt end portions, and means for fastening the first and second splice members together to secure therebetween the belt end portions.

The invention also provides a mechanical splice apparatus for securing together the end portions of a belt member, the belt member including an a roller member engaging portion, and a transition portion between each end portion and the roller member engaging portion, the splice apparatus comprising a first splice member including a belt engaging surface having a flat section adapted to engage one of the belt end portions, and a curved support section having a plurality of curved segments including a first segment having a radius of curvature and being adapted to support one of the transition portions, and a second segment having a radius of curvature which is greater than the radius of curvature of the first segment and being adapted to support part of the roller member engaging portion of the belt member, a second splice member including a belt engaging surface having a flat section adapted to engage the other of the belt end portions, and means for fastening the first and second splice members together to secure therebetween the belt end portions.

Other features and advantages of the invention will become apparent to those of ordinary skill in the art upon review of the following detailed description, claims, and drawings.

BRIEF DESCRIPTION OF THE DRAWINGS

FIG. 1 is a partial side view of a belt elevator arrangement employing a belt assembly which is shown supported by a pulley.

FIG. 2 is an enlarged partial perspective view of a portion of the belt assembly illustrated in FIG. 1 and including a splice apparatus embodying various features of the invention.

FIG. 3 is an enlarged cross-sectional side view of the splice apparatus illustrated in FIG. 2.

FIG. 4 is a section view taken along line 4—4 in FIG. 3.

FIG. 5 is a reduced plan view of an inner splice plate component of the splice apparatus illustrated in FIG. 3.

FIG. 6 is a cross-sectional view taken along line 6—6 in FIG. 5.

FIG. 7 is a reduced side view of an outer splice plate component of the splice apparatus illustrated in FIG. 3.

FIG. 8 is a plan view of the outer splice plate illustrated in FIG. 7.

FIG. 9 is a reduced diagrammatic side view of the belt splice apparatus shown in FIG. 3.

FIG. 10 is a reduced side view similar to FIG. 9, and illustrating an alternative splice member configuration.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Illustrated in FIG. 1 is part of a material transport or elevator assembly 10 including a belt support structure such as a roller member or pulley 12 supported on a frame (not shown) and a belt assembly 14 which is supported on the pulley 12 and which embodies various features of the invention. The belt assembly 14 is preferably adapted to support one or more buckets (not shown) for transporting materials such as cement and is capable of sustaining the high tension produced under such loads.

While in the illustrated arrangement the belt assembly 14 is employed in a belt elevator application, it should be understood that the belt assembly 14 can be adapted for use in a variety of applications to convey, transport or support a variety of objects or materials.

The belt assembly 14 comprises one or more elongated, flexible members or belts which are spliced together at their ends, as will be further explained below, to expand the length of the belt assembly 14 or to form a continuous belt loop. In the illustrated arrangement, sections of a single belt 16 are shown. The belt 16 can be made of a fabric carcas or steel cable belting, although other suitable materials can also be used.

As shown in FIGS. 2 and 3, the belt 16 includes opposite end portions 18 and 20 that are to be spliced together and a portion 22 that is engageable with the pulley 12 as the belt assembly 14 travels thereover. The belt 16 also includes transitional portions 24 and 25 which extend between the end portions 18 and 20 and the pulley engaging portion 22 and which generally do not contact the pulley 12.

The belt assembly 14 also comprises one or more splice assemblies or apparatus 26 (only one is shown) for splicing together the belt end portions 18 and 20 to form a belt loop. Although only a single splice apparatus 26 is shown, the belt assembly 14 can employ any number of splice apparatus 26 depending on the number of belts to be spliced together.

Referring to FIGS. 2 and 3, the splice apparatus 26 includes an inner splice plate 28 located between the belt end portions 18 and 20. As shown in FIG. 5, the inner splice plate is provided with a series of hole patterns, with each hole pattern including a large diameter hole 30, a plurality of relatively small diameter holes 32, and one or more intermediate diameter holes 34 (three are shown). Spacer bushings 36 (FIG. 6) are mounted through the intermediate diameter holes 34 via press fitting or other suitable means. While various hole arrangements can be employed, FIG. 5 illustrates a layout of preferred hole patterns.

Additionally, the inner splice plate 28 can, if desired, be provided with a rounded portion (not shown) on one end thereof, like the rounded end 27 provided in U.S. Pat. No. 4,489,827, the disclosure of which is incorporated herein by reference.

The splice apparatus 26 also includes first and second splice members 40 and 42 positioned in opposing relation on the outside of the belt end portions 18 and 20. The first and second splice members 40 and 42 are preferably identical and one is representatively shown in FIGS. 7 and 8. More specifically, the first and second splice members 40 and 42 include respective outer splice plates 44 and 46. While in other constructions the outer splice plates 44 and 46 can be separately and variously configured, in the illustrated construction these splice plates are each generally hook-shaped or L-shaped and each includes a flat portion or leg 48 and a nonlinear or curved portion or leg 50 which generally extends laterally outwardly from one end of the flat leg 48.

To facilitate assembly of the splice apparatus 26, the flat legs 48 of each of the outer splice plates 44 and 46 are provided with a series of hole patterns (FIG. 8). These hole patterns are arranged to match the hole patterns in the inner splice plate 28 and each of these hole patterns includes a large diameter hole 52 located adjacent the curved leg 50 of one of the outer splice plates 44 and 46 and a plurality of relatively small diameter holes 54 below the large hole 52. Mounted through each large hole 52 by means such as press fitting is a flanged bushing 56 which also protrudes into one of the large holes 30 in the inner splice plate 28.

To stiffen the splice apparatus 26, braces or gussets 60 are provided on one side of each of the outer splice plates 44 and 46. The gussets 60 are secured between the curved leg 50 and the flat leg 48 of each of the outer splice plates 44 and 46 via welding or other suitable mechanical means. While any number of gussets 60 can be employed on each of the outer splice plates 44 and 46 depending on considerations such as the width of these plates and the loads to which the outer splice plates 44 and 46 are subjected, in the illustrated construction the outer splice plates 44 and 46 are each provided with gussets 60 at the ends thereof and between the hole patterns.

To support the belt end portions 18 and 20 in spliced relation, a belt engaging surface 62 is defined on each of the outer splice plates 44 and 46 on the side opposite the side on which the gussets 60 are located. As shown in FIG. 3, the belt engaging surface 62 of each of the outer splice plates 44 and 46 is provided with a first or flat surface portion or section 64 which is formed on the inwardly facing side of one of the flat legs 48. Each flat section 64 engages one of the belt end portions 18 and 20 such that the belt end portions 18 and 20 are each sandwiched between one of the flat legs 48 and the inner splice plate 28. Each of the belt engaging surfaces 62 also includes a nonlinear or curved surface portion or section 66 which is formed on the side of one of the curved legs 50 opposite the gussets 60 and which functions to support one of the transition portions 24 and 25 and part of the pulley engaging portion 22 of the belt 16.

One aspect of the applicant's invention is the recognition that the configuration of the belt engaging surfaces 62, and particularly the contour of the curved sections 66, can have a significant affect on the wear characteristics of the belt assembly 14. In particular, repeated belt flexure caused by the application of variable tensile loads has proved to be detrimental to belt life and performance. Such repeated belt flexure can cause fatigue in various components of a belt arrangement and can lead to accelerated belt wear and increased maintenance or replacement of belt assembly parts. In prior art belt arrangements this is especially so in the area of a splice device, where localized belt flexure can be exacerbated when this area is drawn over belt support structure such as the pulley 12. In the prior art splice devices, right angled outer splice plates or outer splice plates having rounded portions with constant radii of curvature have failed to satisfactorily reduce localized belt flexure. Hence, another aspect of the applicant's invention is the provision of outer splice plates having belt engaging surfaces with compound curvature to reduce the occurrence of harmful localized flexing.

More specifically, the curved belt engaging sections 66 of each of the outer splice plates 44 and 46 include a plurality of segments for permitting a more gradual change in direction of the belt end portions 18 and 20 relative to that part of the belt 16 lying in line with the direction of tensile force F. As diagrammatically shown in FIG. 9, each of the curved sections 66 includes an arcuate inner or first segment 68 for supporting one of the transitional portions 24 and 25 of the belt 16, and an arcuate outer or second segment 70 for supporting part of the pulley engaging portion 22 of the belt 16. The first and second segments 68 and 70 of each curved section 66 have respective radii of curvature 72 and 74. While the radii of curvature 72 and 74 can be variously dimensioned, it is preferred that they be dimensioned to match the pulley size, and it is important that the radii of curvature 74 of the second segment 70 be greater than, and preferably substantially greater than, the radii of curvature 72 of the first segment 68. In a preferred embodiment, the pulley 12 has a radius of approximately fourteen inches and the radii of curvature 72 and 74 are approximately two inches and ten inches, respectively.

In the illustrated arrangement, a third curved segment 76 is provided at the terminal end of the curved leg 50 of each of the outer splice plates 44 and 46. The third segments 76 curve away from the belt 16 to avoid contacting the belt 16 with rough or sharp edges. In the embodiment illustrated in FIG. 9, each of the third segments 76 has a radius of curvature 78 of about one inch.

Illustrated in FIG. 10 is diagram wherein a splice member having having an alternative belt engaging surface configuration is depicted, and wherein like numbers denote common components of this embodiment and the previous embodiment. In this embodiment, the belt engaging surface 62 of the outer splice plate 44 includes a curved section 80 which is shaped as one of the symmetric halves of a parabola (i.e. semi-parabolic), such that the curved section 80, when employed in a splice apparatus 26, approaches the direction of the tensile force F on the belt 16 asymptotically. Thus, it can be said that the curved section 80 includes a plurality of segments or increments which each support part of one of the transition portions 24 and 25 of the belt 16, and a plurality of segments or increments which each support part of the pulley engaging portion 22 of the belt 16.

Accordingly, while the curved belt engaging sections 66 of the splice apparatus 26 of the first embodiment can be provided with first and second segments 68 and 70 having different radii of curvature 72 and 74, it can be seen from FIG. 10 that any number of curved segments or increments can be employed, provided successive segments in the outward direction have constant or increasing radii of curvature, and provided that those segments which contact parts of the pulley engaging portion 22 of the belt 16 have radii of curvature greater than those segments or increments which contact the transitional portions 24 and 25 of the belt 16.

The splice apparatus 26 also includes means for securing or fastening the splice members 40 and 42 together to secure therebetween the belt end portions 18 and 20. While various fastening means can be employed, in the illustrated arrangement the fastening means includes a plurality of large diameter bolts 82 received through matching pairs of flanged bushings 56 in the outer splice plates 44 and 46. The matching flanged bushings 56 extend through holes in the belt end portions 18 and 20 and the large bolts 82 are tightened so that these matching bushings 56 press against each other with a predetermined force, thereby pretensioning the large bolts 82. The fastening means is also provided with a plurality of smaller diameter bolts 84 received through selected small holes 54 in the outer splice plates 44 and 46 and through the spacer bushings 36 which also extend through the belt end portions 18 and 20. Like the large bolts 82, the small bolts 84 are tightened such that the ends of the spacer bushings 36 press against the flat legs 48 of the outer splice plates 44 and 46 to pretension the small bolts 84. Additionally, the fastening means is provided with a plurality of pins or bolts 86 inserted through the remaining small holes 54 and 32 in the outer splice plates 44 and 46 and the inner splice plate 28 and through the belt end portions 18 and 20.

The bolts 82, 84 and 86 cooperate to fasten the belt end portions 18 and 20 between the first and second splice members 40 and 42. More specifically, the tensile force F on the belt 16 tends to pull the belt end portions 18 and 20, and hence the splice members 40 and 42, apart. The large bolts 82 function to resist separation of the splice members 40 and 42. The spacer bushings 36 resist any tendency of the outer splice plates 44 and 46 to move together at the ends farthest away from the curved legs 50. Additionally, the bolts 86 function to resist shear forces which tend to cause the belt end portions 18 and 20 to slide out from between the outer splice plates 44 and 46.

Advantageously, the reduction of localized belt flexure brought about by the compound curve design of the curved belt engaging sections 66 of the outer splice plates 44 and 46 helps to reduce the cyclical shear stresses exerted on the bolts 82, 84 and 86. While the large and small bolts 82 and 84 are pretensioned to avoid fatiguing under variable shear stresses, the bolts 86 do not benefit from this advantage. Hence, fatigue failure of the bolts, and especially the bolts 86, is also reduced by the configuration of the curved legs 50.

Other features and advantages of the invention are set forth in the following claims.

I claim:

1. A belt assembly comprising:
   a belt member including a pair of end portions and a roller member engaging portion;
   a first splice member including a belt engaging surface having a first section engaging one of the end portions, and a curved section including a first segment and a second segment engageable with the roller member engaging portion, said first and second segments including respective first and second radii of curvature, said second radius of curvature being greater than said first radius of curvature;

a second splice member including a belt engaging surface having a first section engaging the other of the end portions; and means for fastening said first and second splice members together to secure therebetween the end portions of said belt member.

2. A belt assembly as set forth in claim 1 wherein the belt engaging surface of said second splice member includes a curved section including a first segment having a first radius of curvature, and a second segment having a second radius of curvature greater than the first radius of curvature of the first segment of the second splice member and being engageable with the roller member engaging portion of the other of said belt sections.

3. A belt assembly as set forth in claim 1 wherein said first segment is positioned between said second segment and said first section, wherein said belt member includes a transition portion between said one end portion and the roller member engaging portion, and wherein said transition portion engages said first segment.

4. A belt assembly as set forth in claim 1 wherein said curved section extends laterally outwardly from said first section.

5. A belt assembly as set forth in claim 4 wherein said curved section includes a plurality of segments extending successively in the laterally outward direction, wherein each of said segments has a radius of curvature, and wherein successive of the segments in the laterally outward direction include successively larger radii of curvature.

6. A mechanical splice apparatus for securing together a pair of belt end portions, said splice apparatus comprising:

a first splice member including a belt engaging surface having a first section adapted to engage one of the belt end portions, and a support section adapted to support a belt portion which is adjacent the one belt end portion, the support section including a first curved segment and a second curved segment, said first curved segment being positioned between said second curved segment and said first section, and said first and second curved segments including respective first and second radii of curvature, said second radius of curvature being greater than said first radius of curvature;

a second splice member including a belt engaging surface having a first section adapted to engage the other of the belt end portions; and means for fastening said first and second splice members together to secure therebetween the belt end portions.

7. A splice apparatus as set forth in claim 6 wherein the belt engaging surface of said second splice member includes a support section adapted to support a belt portion which is adjacent the other belt end portion, and including a first curved segment having a first radius of curvature, and a second curved segment having a second radius of curvature greater than the first radius of curvature of the first curved segment of the second splice member, the first segment of said second splice member being positioned between the second segment of said second splice member and the first section of said second splice member.

8. A splice apparatus as set forth in claim 6 wherein said support section extends laterally outwardly from said first section of said first splice member.

9. A splice apparatus as set forth in claim 8 wherein said support section includes a plurality of successive curved segments extending in the laterally outward direction, wherein each of said segments has a radius of curvature, and wherein successive of the segments in the laterally outward direction include successively larger radii of curvature.

10. A splice apparatus as set forth in claim 6 wherein said second radius of curvature is substantially greater than said first radius of curvature.

11. A mechanical splice apparatus for securing together the end portions of a of belt member, the belt member including a roller member engaging portion, and a transition portion between each end portion and the roller member engaging portion, said splice apparatus comprising:

a first splice member including a belt engaging surface having a first section adapted to engage one of the belt end portions, and a curved support section having a plurality of curved segments including a first segment having a radius of curvature and being adapted to support one of the transition portions, and a second segment having a radius of curvature which is greater than the radius of curvature of the first segment and being adapted to support part of the roller member engaging portion of the first belt;

a second splice member including a belt engaging surface having a first section adapted to engage the other of the belt end portions; and means for fastening the first and second splice members together to secure therebetween the belt end portions.

12. A splice apparatus as set forth in claim 11 wherein the belt engaging surface of said second splice member includes a curved support section having a plurality of curved segments including a first segment having a radius of curvature and being adapted to support the other of the transition portions, and a second segment having a radius of curvature which is greater than the radius of curvature of said first segment of said second splice member and being adapted to support part of the roller member engaging portion of the belt member.

13. A splice apparatus as set forth in claim 12 wherein each of said support sections includes a plurality of first segments, each of said first segments having a radius of curvature and being adapted to support at least part of one of the transition portions of the belt member, and a plurality of second segments, each of said second segments being adapted to support at least part of the roller member engaging portion of the belt member, each of said second segments of said first splice member including a radius of curvature which is greater than the radius of curvature of each of said first segments of said first splice member, and each of said second segments of said second splice member including a radius of curvature which is greater than the radius of curvature of each of said first segments of said second splice member.

14. A splice apparatus as set forth in claim 12 wherein said curved support sections of said first and second splice members extend laterally outwardly from said first sections of said first and second splice members, respectively, wherein said plurality of curved segments of said first splice member extend successively in the laterally outward direction from said first section of said first splice member, and successive of the segments of the first splice member in the laterally outward direction include successively larger radii of curvature, and wherein each of said segments has a radius of curvature, and wherein said plurality of curved segments of said second splice member extend successively in the laterally outward direction from said first section of said second splice member, and successive of the segments of the first splice member in the laterally outward direction include successively larger radii of curvature.

15. A splice apparatus as set forth in claim 12, wherein each of said support sections has a semi-parabolic shape.

16. A splice apparatus as set forth in claim 12 wherein said second radius of curvature of said second segment of said first splice member is substantially greater than said first radius of curvature of said first segment of said first splice member, and wherein said second radius of curvature of said second segment of said second splice member is substantially greater than said first radius of curvature of said first segment of said second splice member.

* * * * *